(12) United States Patent
Wu et al.

(10) Patent No.: US 9,501,170 B2
(45) Date of Patent: Nov. 22, 2016

(54) PIXEL CIRCUIT, DISPLAY DEVICE, AND METHOD FOR DRIVING PIXEL CIRCUIT

(71) Applicants:BOE TECHNOLOGY GROUP CO., LTD., Beijing (CN);
(Continued)

(72) Inventors: Bo Wu, Beijing (CN); Xiaojing Qi, Beijing (CN)

(73) Assignees: BOE TECHNOLOGY GROUP CO., LTD. (CN);
(Continued)

( * ) Notice: Subject to any disclaimer, the term of this patent is extended or adjusted under 35 U.S.C. 154(b) by 0 days.

(21) Appl. No.: 14/361,792

(22) PCT Filed: Dec. 17, 2013

(86) PCT No.: PCT/CN2013/089701
§ 371 (c)(1),
(2) Date: May 30, 2014

(87) PCT Pub. No.: WO2015/000275
PCT Pub. Date: Jan. 8, 2015

(65) Prior Publication Data
US 2015/0220201 A1 Aug. 6, 2015

(30) Foreign Application Priority Data
Jul. 1, 2013 (CN) .......................... 2013 1 0271688

(51) Int. Cl.
*G06F 3/041* (2006.01)
*G09G 3/32* (2016.01)

(52) U.S. Cl.
CPC .......... *G06F 3/0416* (2013.01); *G06F 3/0412* (2013.01); *G09G 3/3233* (2013.01);
(Continued)

(58) Field of Classification Search
USPC ......................................................... 345/173
See application file for complete search history.

(56) References Cited

U.S. PATENT DOCUMENTS

2005/0093791 A1  5/2005  Lo
2006/0164344 A1  7/2006  Fish
(Continued)

FOREIGN PATENT DOCUMENTS

CN        1669067 A     9/2005
CN      101576676 A    11/2009
(Continued)

OTHER PUBLICATIONS

P.R. China, First Office Action, App. No. 201310271688.2, Nov. 3, 2014.
(Continued)

*Primary Examiner* — Jason Olson
*Assistant Examiner* — Deeprose Subedi
(74) *Attorney, Agent, or Firm* — BakerHostetler LLP

(57) ABSTRACT

The present invention is directed to a pixel circuit for a display device and to a method for driving the pixel circuit. The pixel circuit comprises: a light-emitting unit configured to emit light under the control of the light-emission controlling unit; a light-emission controlling unit configured to control the light-emitting unit to emit light at a display stage; a touching unit configured to generate a touch signal; a driver amplifying unit configured to amplify the touch signal at a touch stage and drive the light-emitting unit to emit light at the display stage; a charging unit configured to charge a compensating unit; the compensating unit configured to be charged by the high voltage end prior to the display stage, and be charged by the charging unit at the display stage.

15 Claims, 4 Drawing Sheets

(71) Applicants: CHENGDU BOE OPTOELECTRONICS TECHNOLOGY CO., LTD., Sichuan Province (CN)

(73) Assignees: CHENGDU BOE OPTOELECTRONICS TECHNOLOGY CO., LTD. (CN)

(52) U.S. Cl.
CPC .... *G09G 3/3258* (2013.01); *G09G 2300/0819* (2013.01); *G09G 2300/0852* (2013.01); *G09G 2300/0861* (2013.01); *G09G 2320/0233* (2013.01); *G09G 2320/045* (2013.01); *G09G 2354/00* (2013.01); *G09G 2360/148* (2013.01)

(56) References Cited

U.S. PATENT DOCUMENTS

| | | | |
|---|---|---|---|
| 2006/0214893 | A1 | 9/2006 | Tseng et al. |
| 2006/0267508 | A1 | 11/2006 | Sun |
| 2009/0153438 | A1 | 6/2009 | Miller et al. |
| 2009/0225011 | A1 | 9/2009 | Choi |
| 2009/0231308 | A1 | 9/2009 | Numao |
| 2010/0012823 | A1 | 1/2010 | Ahn et al. |
| 2010/0039406 | A1 | 2/2010 | Lee et al. |
| 2010/0097350 | A1 | 4/2010 | Choi et al. |
| 2010/0097354 | A1 | 4/2010 | Ahn et al. |
| 2010/0144391 | A1 | 6/2010 | Chang et al. |
| 2010/0220069 | A1 | 9/2010 | Choi et al. |
| 2011/0001711 | A1 | 1/2011 | Choi et al. |
| 2011/0115764 | A1 | 5/2011 | Chung |
| 2012/0038585 | A1 | 2/2012 | Kim |
| 2012/0044176 | A1* | 2/2012 | Nakamura et al. ........... 345/173 |
| 2012/0061556 | A1 | 3/2012 | Chan et al. |
| 2012/0154319 | A1 | 6/2012 | Konicek |
| 2013/0063407 | A1 | 3/2013 | Usukura et al. |
| 2013/0088165 | A1 | 4/2013 | Wang et al. |
| 2013/0106828 | A1 | 5/2013 | Kim |
| 2013/0127787 | A1 | 5/2013 | Kim et al. |
| 2013/0146881 | A1 | 6/2013 | Yamazaki et al. |
| 2014/0055326 | A1 | 2/2014 | Lai |
| 2014/0118231 | A1* | 5/2014 | Yang et al. ..................... 345/82 |
| 2014/0168127 | A1* | 6/2014 | Yang ............................. 345/173 |

FOREIGN PATENT DOCUMENTS

| | | |
|---|---|---|
| CN | 101587256 A | 11/2009 |
| CN | 101587400 A | 11/2009 |
| CN | 101630481 | 1/2010 |
| CN | 101726890 | 6/2010 |
| CN | 101943974 A | 1/2011 |
| CN | 101944323 A | 1/2011 |
| CN | 102117596 A | 7/2011 |
| CN | 102402931 A | 4/2012 |
| CN | 102903333 | 1/2013 |
| CN | 103135846 | 6/2013 |
| CN | 103135846 A | 6/2013 |
| CN | 103295525 A | 9/2013 |
| CN | 103325343 | 9/2013 |
| CN | 103325343 A | 9/2013 |
| CN | 103354078 A | 10/2013 |
| CN | 103354079 A | 10/2013 |
| CN | 103354080 A | 10/2013 |
| CN | 203242305 U | 10/2013 |
| CN | 203300191 U | 11/2013 |
| CN | 203300192 U | 11/2013 |
| CN | 203300193 U | 11/2013 |
| CN | 203300194 | 11/2013 |
| JP | 2010-085526 A | 4/2010 |
| KR | 20070115261 | 12/2007 |
| KR | 2009-0009387 A | 1/2009 |

OTHER PUBLICATIONS

International Search Report and Written Opinion issued in corresponding International Application No. PCT/CN2013/089701 dated Apr. 3, 2014.
Office Action in Chinese Patent Application No. 201310260045.8, dated Nov. 24, 2014.
International Search Report and Written Opinion in PCT International Application No. PCT/CN2013/084057, dated Mar. 27, 2014.
Office Action in Chinese Patent Application No. 201310260936.3, dated Dec. 3, 2014.
Office Action in Chinese Patent Application No. 201310260936.3, dated Feb. 28, 2015.
Office Action in Chinese Patent Application No. 201310260936.3, dated Sep. 30, 2015.
International Search Report and Written Opinion in PCT International Application No. PCT/CN2013/084055, dated Apr. 3, 2014.
Office Action in Chinese Patent Application No. 201310259706.5, dated Nov. 15, 2014.
International Search Report and Written Opinion in PCT International Application No. PCT/CN2013/084919, dated Apr. 3, 2014.

* cited by examiner

US 9,501,170 B2

PIXEL CIRCUIT, DISPLAY DEVICE, AND METHOD FOR DRIVING PIXEL CIRCUIT

CROSS-REFERENCE TO RELATED APPLICATION

This application is the U.S. national phase of PCT Application No. PCT/CN2013/089701 filed on Dec. 17, 2013, which claims priority to Chinese Patent Application No. 201310271688.2 filed on Jul. 1, 2013, the disclosures of which are incorporated in their entirety by reference herein.

TECHNICAL FIELD

The present invention relates to the field of display technology, in particular to a pixel circuit, a display device and a method for driving the pixel circuit.

BACKGROUND

Active matrix organic light-emitting diode (AMOLED) is widely used due to its advantages such as wide viewing angle, excellent color contrast, rapid response and low cost. A driving thin film transistor (TFT) drives the AMOLED to emit light through a current generated in a saturation state. Due to the lack of uniformity and stability during the manufacturing of a back plate of the TFT, threshold voltage (Vth) drift will occur in the driving TFT. The driving current for lightening the AMOLED is associated with the threshold voltage of the driving TFT. When the threshold voltage drift occurs in the driving ITT and different AMOLEDs receive an identical data voltage (Vdata), the current for driving it to emit light will vary. As a result, an entire image will be displayed non-uniformly.

SUMMARY

An object of embodiments of the present invention is to provide a pixel circuit, a display device and a method for driving the pixel circuit, so as to prevent an entire image from being displayed non-uniformly due to the non-uniform current passing through different AMOLEDs when threshold voltage drift occurs in an existing driving TFT and the AMOLEDs receive an identical data voltage.

In one aspect, an embodiment of the present invention provides a pixel circuit, comprising a driver amplifying unit, a compensating unit, a light-emitting unit, a light-emission controlling unit, a charging unit, a touching unit and an outputting unit. The light-emitting unit is coupled with the light-emission controlling unit and a low voltage end, so as to emit light under the control of the light-emission controlling unit. The light-emission controlling unit is coupled with the light-emitting unit and the driver amplifying unit, so as to control the light-emitting unit to emit light at a display stage. The touching unit is coupled with the driver amplifying unit and the low voltage end, so as to generate a touch signal. The driver amplifying unit is coupled with the compensating unit, a high voltage end, the touching unit and the light-emission controlling unit, so as to amplify the touch signal generated by the touching unit at a touch stage and drive the light-emitting unit to emit light at the display stage. The outputting unit is coupled with the driver amplifying unit, so as to output the touch signal amplified by the driver amplifying unit. The charging unit is coupled with the compensating unit so as to charge the compensating unit. The compensating unit is coupled with the charging unit, the driver amplifying unit, the low voltage end and the high voltage end, so as to be charged by the high voltage end prior to the display stage so that a gate voltage of the driver amplifying unit is equal to a threshold voltage of the driver amplifying unit, and be charged by the charging unit at the display stage so that the gate voltage of the driver amplifying unit is equal to a sum of a data voltage output by the charging unit and the threshold voltage.

Preferably, the driver amplifying unit comprises a first TFT, a gate electrode of the first TFT is coupled with the compensating unit and the touching unit, a first electrode of the first TFT is coupled with the high voltage end, and a second electrode of the first TFT is coupled with the light-emission controlling unit and the outputting unit.

Preferably, the compensating unit comprises a third TFT, a fourth TFT, a first capacitor and a second capacitor. A gate electrode of the third TFT is coupled with a first control signal input end, a first electrode of the third TFT is coupled with the high voltage end, and a second electrode of the third TFT is coupled with the gate electrode of the first TFT. A gate electrode of the fourth TFT is coupled with the first control signal input end, a first electrode of the fourth TFT is coupled with the charging unit, and a second electrode of the fourth TFT is coupled with the second electrode of the first TFT. One end of the first capacitor is coupled with the gate electrode of the first TFT and the second electrode of the third TFT, and the other end of the first capacitor is coupled with one end of the second capacitor, the first electrode of the fourth TFT and the charging unit. One end of the second capacitor is coupled with the low voltage end, and the other end of the second capacitor is coupled with one end of the first capacitor, the first electrode of the fourth TFT and the charging unit.

Preferably, the charging unit comprises a second TFT, a gate electrode of the second TFT is coupled with a second control signal input end, a first electrode of the second TFT is coupled with a data signal input end, and a second electrode of the second TFT is coupled with the first electrode of the fourth TFT.

Preferably, the light-emission controlling unit comprises a fifth TFT, a gate electrode of the fifth TFT is coupled with a third control signal input end, a first electrode of the fifth TFT is coupled with the second electrode of the first TFT, and a second electrode of the fifth TFT is coupled with the light-emitting unit.

Preferably, the touching unit comprises a touch signal generating unit and a seventh TFT. One end of the touch signal generating unit is coupled with the seventh TFT, and the other end of the touch signal generating unit is coupled with the low voltage end. A gate electrode of the seventh TFT is coupled with a fourth control signal input end, a first electrode of the seventh TFT is coupled with the gate electrode of the first TFT, and a second electrode of the seventh TFT is coupled with the touch signal generating unit.

Preferably, the outputting unit comprises a sixth TFT, a gate electrode of the sixth TFT is coupled with the fourth control signal input end, a first electrode of the sixth TFT is coupled with the second electrode of the first TFT, and a second electrode of the sixth TFT is coupled with a touch signal output end.

In another aspect, an embodiment of the present invention provides a display device comprising the above-mentioned pixel circuit.

In yet another aspect, an embodiment of the present invention provides a method for driving the above-mentioned pixel circuit, comprising: a touching step, generating a touch signal by a touching unit, amplifying the touch signal by a driver amplifying unit, and outputting the touch signal amplified by the driver amplifying unit by an outputting unit; a threshold voltage compensating step, charging a compensating unit by a high voltage end, so that a gate voltage of the driver amplifying unit is equal to a threshold voltage of the driver amplifying unit; and a displaying step, charging the compensating unit by the charging unit, so that the gate voltage of the driver amplifying unit is equal to a sum of a data voltage output by the charging unit and the threshold voltage.

Preferably, the touching step comprises an initializing step, switching on a first TFT, a third TFT and a fourth TFT and switching off a second TFT, a fifth TFT, a sixth TFT and a seventh TFT by controlling levels of a first control signal, a second control signal, a third control signal and a fourth control signal; and a touch detecting step, switching on the first TFT, the sixth TFT and the seventh TFT and switching off the second TFT, the third TFT, the fourth TFT and the fifth TFT.

Preferably, the threshold voltage compensating step comprises switching on the first TFT, the third TFT and the fourth TFT and switching off the second TFT, the fifth TFT, the sixth TFT and the seventh TFT by controlling the levels of the first control signal, the second control signal, the third control signal and the fourth control signal, so that a second capacitor is charged by the high voltage end until a gate voltage of the first TFT is equal to a threshold voltage of the first TFT. The displaying step comprises switching on the second TFT and the fifth TFT and switch off the first TFT, the third TFT, the fourth TFT, the sixth TFT and the seventh TFT, so that the second capacitor is charged by a data signal input end and the gate voltage of the first TFT is equal to a sum of a data voltage output by the data signal input end and the threshold voltage of the first TFT.

Preferably, subsequent to the displaying step, the method further comprises a display maintaining step, switching on the fifth TFT and switching off the first TFT, the second TFT, the third TFT, the fourth TFT, the sixth TFT and the seventh TFT by controlling the levels of the first control signal, the second control signal, the third control signal and the fourth control signal.

Preferably, subsequent to the touching step and prior to the threshold voltage compensating step, the method further comprises a buffering step, switching off the first TFT, the second TFT, the third TFT, the fourth TFT, the fifth TFT, the sixth TFT and the seventh TFT by controlling the levels of the first control signal, the second control signal, the third control signal and the fourth control signal, so that the gate voltage of the first TFT is equal to a voltage of a low voltage end.

Embodiments of the present invention have the following advantageous effects. The pixel circuit of the present invention has both an In-cell touching function and a display driving function capable of compensating the threshold voltage, so as to achieve the integration of In-cell touching and display driving. As a result, it is able to provide a thin and light display screen, thereby to reduce the product cost. Meanwhile, because the threshold voltage is compensated, when different light-emitting units receive the same data voltage, the current for driving them to emit light will be the same even if threshold voltage drift occurs in the driver amplifying unit. As a result, it is able to ensure uniform brightness of the entire image.

DETAILED DESCRIPTION

There are two types of touch screens, i.e., external touch screens and In-cell touch screens. For the external touch screen, a touch device is added onto a display panel, while for the In-cell touch screen, the touch device is integrated into the display panel so as to provide a small, thin and light electronic product. A pixel circuit mentioned in the following embodiments is just a mixed circuit having both an In-cell optical touching function and a driver displaying function.

The present invention will be described hereinafter in conjunction with the drawings and the embodiments.

First Embodiment

Figure 1:
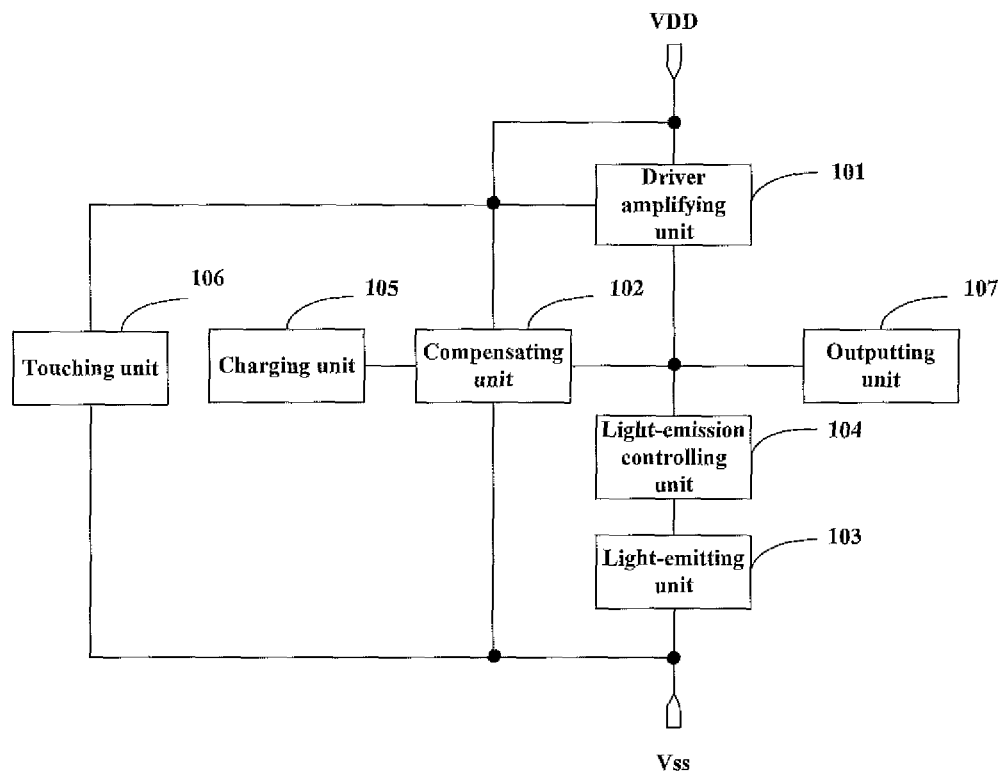
FIG. 1 is a schematic view showing a pixel circuit according to a first embodiment of the present invention.

Referring to FIG. 1, which is a schematic view showing a pixel circuit according to the first embodiment of the present invention, the pixel circuit comprises a driver amplifying unit 101, a compensating unit 102, a light-emitting unit 103, a light-emission controlling unit 104, a charging unit 105, a touching unit 106 and an outputting unit 107.

The light-emitting unit 103 is coupled with the light-emission controlling unit 104 and a low voltage end Vss, so as to emit light under the control of the light-emission controlling unit 104. The light-emitting unit 103 may be an organic light-emitting diode (OLED). The light-emission controlling unit 104 is coupled with the light-emitting unit 103 and the driver amplifying unit 101, so as to control the light-emitting unit 103 to emit light at a display stage. The touching unit 106 is coupled with the driver amplifying unit 101 and the low voltage end Vss, so as to generate a touch signal. The driver amplifying unit 101 is coupled with the compensating unit 102, a high voltage end VDD, the touching unit 106 and the light-emission controlling unit 104, so as to amplify the touch signal generated by the touching unit 106 at a touch stage and drive the light-emitting unit 103 to emit light at the display stage. The outputting unit 107 is coupled with the driver amplifying unit 101, so as to output the touch signal amplified by the driver amplifying unit 101. The charging unit 105 is coupled with the compensating unit 102 so as to charge the compensating unit 102. The compensating unit 102 is coupled with the charging unit 105, the driver amplifying unit 101, the low voltage end Vss and the high voltage end VDD, so as to be charged by the high voltage end VDD prior to the display stage so that a gate voltage of the driver amplifying unit 101 is equal to a threshold voltage of the driver amplifying unit 101, and be charged by the charging unit 105 at the display stage so that the gate voltage of the driver amplifying unit 101 is equal to a sum of a data voltage output by the charging unit 105 and the threshold voltage. A voltage output by the high voltage end VDD is larger than a voltage output by the low voltage end Vss.

In this embodiment, at the touching stage, the touching unit 106 generates the touch signal, the driver amplifying unit 101 amplifies the touch signal, and the outputting unit 107 outputs the touch signal amplified by the driver amplifying unit 101.

Prior to the display stage, the threshold voltage of the driver amplifying unit 101 is compensated, i.e., the compensating unit 102 is charged by the high voltage end VDD so that the gate voltage of the driver amplifying unit 101 is equal to the threshold voltage of the driver amplifying unit 101.

At the display stage, the compensating unit 102 is charged by the charging unit 105 so that the gate voltage of the driver amplifying unit 101 is equal to a sum of the data voltage output by the charging unit 105 and the threshold voltage.

The pixel circuit in this embodiment has both an In-cell touching function and a display driving function capable of compensating the threshold voltage, so as to achieve the integration of In-cell touching and display driving. As a result, it is able to provide a thin and light display screen, thereby to reduce the product cost. Meanwhile, because the threshold voltage is compensated, when different light-emitting units 103 receive the same data voltage, the current for driving them to emit light will be the same even if threshold voltage drift occurs in the driver amplifying unit 101. As a result, it is able to ensure uniform brightness of the entire image.

Second Embodiment

Figure 2:
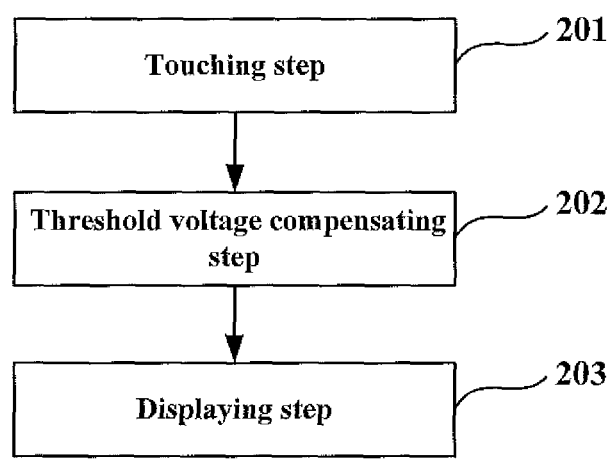
FIG. 2 is a flow chart of a method for driving the pixel circuit according to a second embodiment of the present invention.

In this embodiment, a method for driving the pixel circuit according to the first embodiment is provided. Referring to FIG. 2, which is a flow chart of the method for driving the pixel circuit according to the second embodiment of the present invention, the method comprises the following steps: a touching step 201, generating a touch signal by the touching unit 106, amplifying the touch signal by the driver amplifying unit 101, and outputting the touch signal amplified by the driver amplifying unit 101 by the outputting unit 107; a threshold voltage compensating step 202, charging the compensating unit 102 by the high voltage end VDD so that the gate voltage of the driver amplifying unit 101 is equal to the threshold voltage of the driver amplifying unit 101; and a displaying step 203, charging the compensating unit 102 by the charging unit 105 so that the gate voltage of the driver amplifying unit 101 is equal to a sum of a data voltage output by the charging unit 105 and the threshold voltage.

According to the method for driving the pixel circuit in this embodiment, the pixel circuit has both an In-cell touching function and a display driving function capable of compensating the threshold voltage, so as to achieve the integration of In-cell touching and display driving. As a result, it is able to provide a thin and light display screen, thereby to reduce the product cost. Meanwhile, because the threshold voltage is compensated, when different light-emitting units 103 receive the same data voltage, the current for driving them to emit light will be the same even if threshold voltage drift occurs in the driver amplifying unit 101. As a result, it is able to ensure uniform brightness of the entire image.

Third Embodiment

Figure 3:
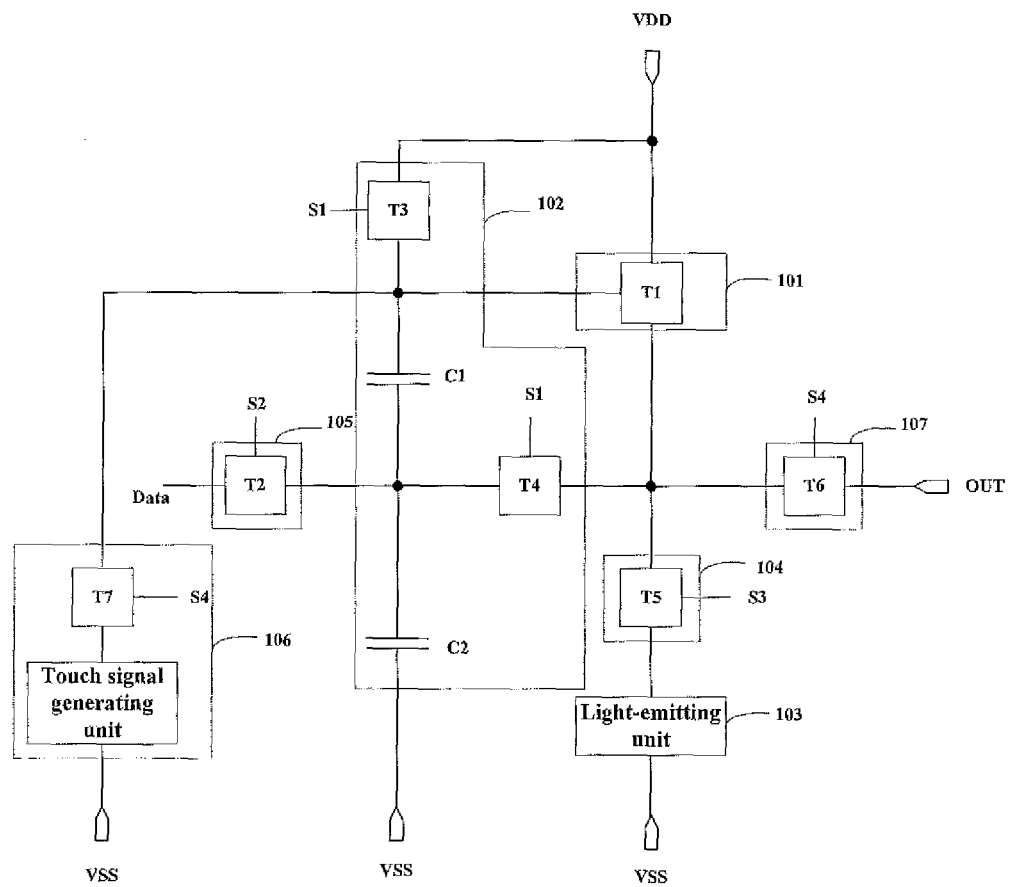
FIG. 3 is a schematic view showing a pixel circuit according to a third embodiment of the present invention.

Referring to FIG. 3, which is a schematic view showing a pixel circuit according to the third embodiment of the present invention, the pixel circuit comprises a driver amplifying unit 101, a compensating unit 102, a light-emitting unit 103, a light-emission controlling unit 104, a charging unit 105, a touching unit 106 and an outputting unit 107.

The light-emitting unit 103 is configured to emit light under the control of the light-emission controlling unit 104. The light-emission controlling unit 104 is configured to control the light-emitting unit 103 to emit light at a display stage. The touching unit 106 is configured to generate a touch signal. The driver amplifying unit 101 is configured to amplify the touch signal generated by the touching unit 106 at a touch stage, and driver the light-emitting unit 103 to emit light at the display stage. The outputting unit 107 is configured to output the touch signal amplified by the driver amplifying unit 101. The charging unit 105 is configured to charge the compensating unit 102. The compensating unit 102 is configured to, prior to the display stage, be charged by a high voltage end VDD so that a gate voltage of the driver amplifying unit 101 is equal to a threshold voltage of the driver amplifying unit 101, and at the display stage, be charged by the charging unit 105 so that the gate voltage of the driver amplifying unit 101 is equal to a sum of a data voltage output by the charging unit 105 and the threshold voltage.

The structure of each unit will be described hereinafter.

The driver amplifying unit 101 comprises a first TFT T1. The charging unit 105 comprises a second TFT T2. The compensating unit 102 comprises a third TFT T3, a fourth TFT T4, a first capacitor C1 and a second capacitor C2. The light-emission controlling unit 104 comprises a fifth TFT T5. The outputting unit 107 comprises a sixth TFT T6. The touching unit 106 comprises a touch signal generating unit and a seventh TFT T7. The touch signal generating unit may be a touching capacitor or a photodiode PD.

A gate electrode of the first TFT T1 is coupled with a second electrode of the third TFT T3, the first capacitor C1 and a first electrode of the seventh TFT T7, a first electrode of the first TFT T1 is coupled with the high voltage end VDD, and a second electrode of the first TFT T1 is coupled with a second electrode of the fourth TFT T4, a first electrode of the fifth TFT T5, and a first electrode of the sixth TFT T6. A gate electrode of the second TFT T2 is coupled with a second control signal input end S2, a first electrode of the second TFT T2 is coupled with a data signal input end Data, and a second electrode of the second TFT T2 is coupled with a first electrode of the fourth TFT T4. A gate electrode of the third TFT T3 is coupled with a first control signal input end S1, a first electrode of the third TFT T3 is coupled with the high voltage end VDD, and the second electrode of the third TFT T3 is coupled with the gate electrode of the first TFT T1. A gate electrode of the fourth TFT T4 is coupled with the first control signal input end S1, the first electrode of the fourth TFT T4 is coupled with the second electrode of the second TFT T2, and the second electrode of the fourth TFT T4 is coupled with the second electrode of the first TFT T1. One end of the first capacitor C1 is coupled with the gate electrode of the first TFT T1 and the second electrode of the third TFT T3, and the other end of the first capacitor C1 is coupled with one end of the second capacitor C2, the first electrode of the fourth TFT T4 and the second electrode of the second TFT T2. One end of the second capacitor C2 is coupled with a low voltage end Vss, and the other end of the second capacitor C2 is coupled with one end of the first capacitor C1, the first electrode of the fourth TFT T4, and the second electrode of the second TFT T2. A gate electrode of the fifth TFT T5 is coupled with a third control signal input end S3, the first electrode of the fifth TFT T5 is coupled with the second electrode of the first TFT T1, and a second electrode of the fifth TFT T5 is coupled with the light-emitting unit 103. A gate electrode of the sixth TFT T6 is coupled with a fourth control signal input end S4, the first electrode of the sixth TFT T6 is coupled with the second electrode of the first TFT T1, and a second electrode of the sixth TFT T6 is coupled with a touch signal output end Out. One end of the touch signal generating unit is coupled with the seventh TFT T7, and the other end of the touch signal generating unit is coupled with the low voltage end Vss. A gate electrode of the seventh TFT T7 is coupled with the fourth control signal input end S4, the first electrode of the seventh TFT T7 is coupled with the gate electrode of the first TFT T1, and a second electrode of the seventh TFT T7 is coupled with the touch signal generating unit. A voltage output by the high voltage end VDD is larger than a voltage output by the low voltage end Vss.

In this embodiment, at a touch detecting stage, the first TFT T1, the sixth TFT T6 and the seventh TFT T7 are switched on and the second TFT T2, the third TFT T3, the fourth TFT T4 and the fifth TFT T5 are switched off by controlling levels of the first control signal, the second control signal, the third control signal and the fourth control signal.

At a threshold voltage compensating stage, the first TFT T1, the third TFT T3 and the fourth TFT T4 are switched on and the second TFT T2, the fifth TFT T5, the sixth TFT T6 and the seventh TFT T7 are switched off by controlling the levels of the first control signal, the second control signal, the third control signal and the fourth control signal, so that the second capacitor C2 is charged by the high voltage end VDD until the gate voltage of the first TFT T1 is equal to its threshold voltage.

At the display stage, the second TFT T2 and the fifth TFT T5 are switched on and the first TFT T1, the third TFT T3, the fourth TFT T4, the sixth TFT T6 and the seventh TFT T7 are switch of by controlling the levels of the first control signal, the second control signal, the third control signal and the fourth control signal, so that the second capacitor C2 is charged by the data signal input end and the gate voltage of the first TFT T1 is equal to a sum of the data voltage output by the data signal input end and the threshold voltage of the first TFT T1.

The pixel circuit in this embodiment has both an In-cell touching function and a display driving function capable of compensating the threshold voltage, so as to achieve the integration of In-cell touching and display driving. As a result, it is able to provide a thin and light display screen, thereby to reduce the product cost. Meanwhile, because the threshold voltage is compensated, when different light-emitting units 103 receive the same data voltage, the current for driving them to emit light will be the same even if threshold voltage drift occurs in the first TFT T1. As a result, it is able to ensure uniform brightness of the entire image. In addition, the circuit is implemented easily, thereby to reduce the product cost further.

Fourth Embodiment

Figure 4:
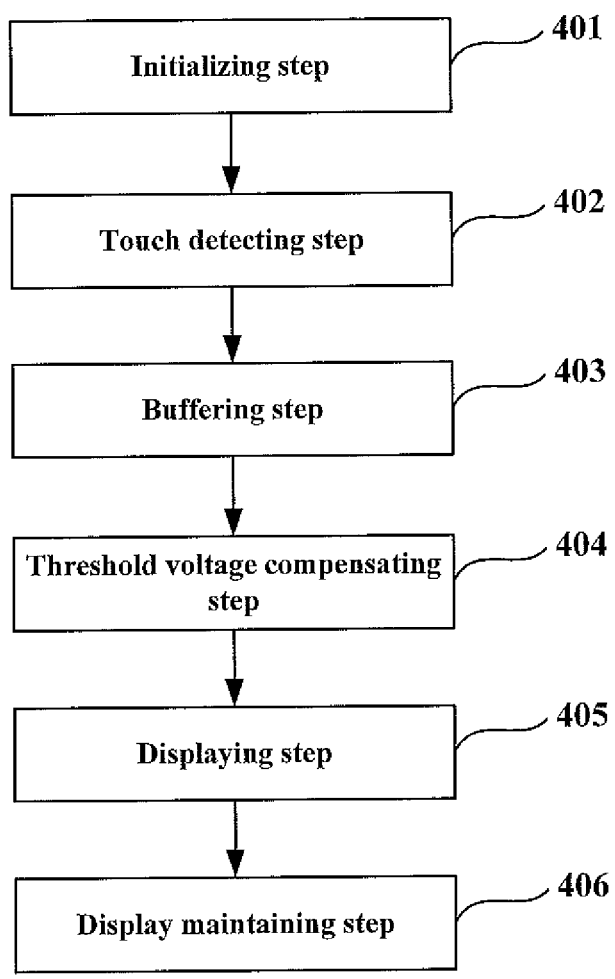
FIG. 4 is a flow chart of a method for driving the pixel circuit according to a fourth embodiment of the present invention.

In this embodiment, a method for driving the pixel circuit according to the third embodiment is provided. Referring to FIG. 4, which is a flow chart of the method for driving the pixel circuit, the method comprises the following steps: an initializing step 401, switching on the first TFT T1, the third TFT T3 and the fourth TFT T4 and switching off the second TFT T2, the fifth TFT T5, the sixth TFT T6 and the seventh TFT T7 by controlling levels of the first control signal, the second control signal, the third control signal and the fourth control signal; a touch detecting step 402, switching off the first TFT T1, the sixth TFT T6 and the seventh TFT T7 and switching off the second TFT T2, the third TFT T3, the fourth TFT T4 and the fifth TFT T5 by controlling levels of the first control signal, the second control signal, the third control signal and the fourth control signal; a buffering step 403, switching off the first TFT T1, the second TFT T2, the third TFT T3, the fourth TFT T4, the fifth TFT T5, the sixth TFT T6 and the seventh TFT T7 by controlling the levels of the first control signal, the second control signal, the third control signal and the fourth control signal, so that the gate voltage of the first TFT T1 is equal to a voltage of the low voltage end Vss; a threshold voltage compensating step 404, switching on the first TFT T1, the third TFT T3 and the fourth TFT T4 and switching off the second TFT T2, the fifth TFT T5, the sixth TFT T6 and the seventh TFT T7 by controlling the levels of the first control signal, the second control signal, the third control signal and the fourth control signal, so that the second capacitor C2 is charged by the high voltage end VDD until the gate voltage of the first TFT T1 is equal to the threshold voltage of the first TFT T1; a displaying step 405, switching on the second TFT T2 and the fifth TFT T5 and switch off the first TFT T1, the third TFT T3, the fourth TFT T4, the sixth TFT T6 and the seventh TFT T7 by controlling the levels of the first control signal, the second control signal, the third control signal and the fourth control signal, so that the second capacitor C2 is charged by the data signal input end and the gate voltage of the first TFT T1 is equal to a sum of the data voltage output by the data signal input end and the threshold voltage of the first TFT T1; and a display maintaining step 406, switching on the fifth TFT T5 and switching off the first TFT T1, the second TFT T2, the third TFT T3, the fourth TFT T4, the sixth TFT T6 and the seventh TFT T7 by controlling the levels of the first control signal, the second control signal, the third control signal and the fourth control signal.

According to the method for driving the pixel circuit in this embodiment, the pixel circuit in this embodiment has both an In-cell touching function and a display driving function capable of compensating the threshold voltage, so as to achieve the integration of In-cell touching and display driving. As a result, it is able to provide a thin and light display screen, thereby to reduce the product cost. Meanwhile, because the threshold voltage is compensated, when different light-emitting units 103 receive the same data voltage, the current for driving them to emit light will be the same even if threshold voltage drift occurs in the first TFT T1. As a result, it is able to ensure uniform brightness of the entire image.

Fifth Embodiment

In this embodiment, a pixel circuit comprising a driver amplifying unit, a compensating unit, a light-emitting unit, a light-emission controlling unit, a charging unit, a touching unit and an outputting unit is provided.

The light-emitting unit is configured to emit light under the control of the light-emission controlling unit. The light-emission controlling unit is configured to control the light-emitting unit to emit light at a display stage. The touching unit is configured to generate a touch signal. The driver amplifying unit is configured to amplify the touch signal generated by the touching unit at a touch stage, and drive the light-emitting unit to emit light at the display stage. The outputting unit is configured to output the touch signal amplified by the driver amplifying unit. The charging unit is configured to charge the compensating unit. The compensating unit is configured to, prior to the display stage, be charged by a high voltage end VDD so that a gate voltage of the driver amplifying unit is equal to the threshold voltage of the driver amplifying unit, and be charged by the charging unit at the display stage so that the gate voltage of the driver amplifying unit is equal to a sum of a data voltage output by the charging unit and the threshold voltage.

Figure 5:
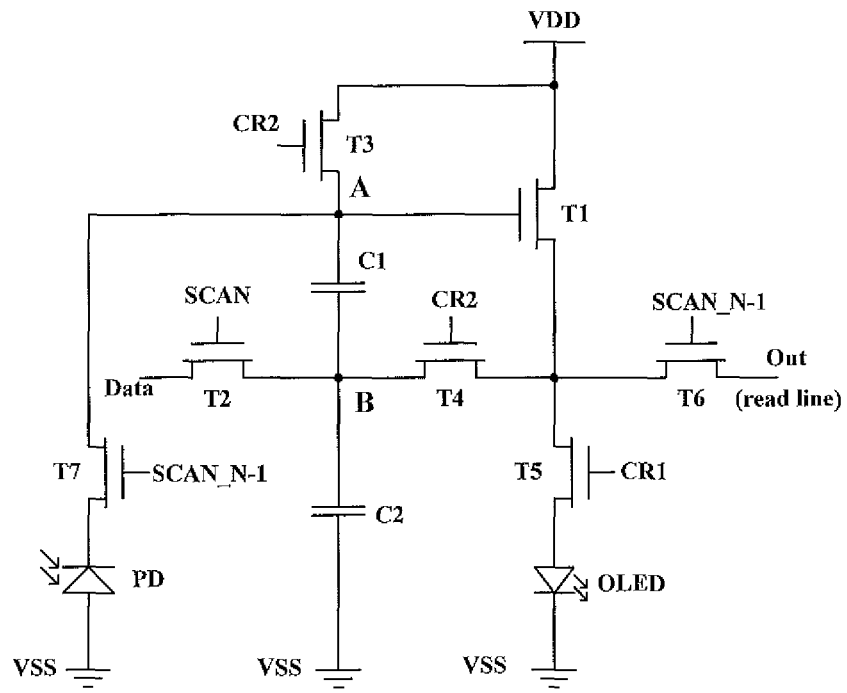
FIG. 5 is a schematic view showing a pixel circuit according to a fifth embodiment of the present invention.

Referring to FIG. 5, the driver amplifying unit comprises a first TFT T1; the charging unit comprises a second TFT T2; the compensating unit comprises a third TFT T3, a fourth TFT T4, a first capacitor C1 and a second capacitor C2; the light-emitting unit comprises an OLED; the light-emission controlling unit comprises a fifth TFT T5; the outputting unit comprises a sixth TFT T6; and the touching unit comprises a photodiode PD and a seventh TFT T7.

A gate electrode of the first TFT T1 is coupled with a source electrode of the third TFT T3, a drain electrode of the first TFT T1 is coupled with the high voltage end VDD, and a source electrode of the first TFT T1 is coupled with a drain electrode of the fifth TFT T5. A gate electrode of the second TFT T2 is coupled with a SCAN_signal input end, a drain electrode of the second TFT T2 is coupled with a data signal input end Data, and a source electrode of the second TFT T2 is coupled with a drain electrode of the fourth TFT T4. A gate electrode of the third TFT T3 is coupled with a CR2 signal input end, a drain electrode of the third TFT T3 is coupled with the high voltage end VDD, and the source electrode of the third TFT T3 is coupled with the gate electrode of the first TFT T1. A gate electrode of the fourth TFT T4 is coupled with the CR2 signal input end, the drain electrode of the third TFT T3 is coupled with the source electrode of the second TFT T2, and the source electrode of the third TFT T3 is coupled with the source electrode of the first TFT T1. One end of the first capacitor C1 is coupled with the gate electrode of the first TFT T1 and the source electrode of the third TFT T3, and the other end of the first capacitor C1 is coupled with one end of the second capacitor C2, the drain electrode of the fourth TFT T4 and the source electrode of the second TFT T2. One end of the second capacitor C2 is coupled with the low voltage end Vss, and the other end of the second capacitor C2 is coupled with one end of the first capacitor C1, the drain electrode of the fourth TFT T4 and the source electrode of the second TFT T2. A gate electrode of the fifth TFT T5 is coupled with a CR1 signal input end, the drain electrode of the fifth TFT T5 is coupled with the source electrode of the first TFT T1, and a source electrode of the fifth TFT T5 is coupled with the OLED. A gate electrode of the sixth TFT T6 is coupled with a SCAN_N−1 signal input end, the drain electrode of the sixth TFT T6 is coupled with the source electrode of the first TFT T1, and a source electrode of the sixth TFT T6 is coupled with a touch signal output end Out. One end of the photodiode PD is coupled with the seventh TFT T7, and the other end of the photodiode PD is coupled with the low voltage end Vss. A gate electrode of the seventh TFT T7 is coupled with the SCAN_N−1 signal input end, the drain electrode of the seventh TFT T7 is coupled with the gate electrode of the first TFT T1, and a source electrode of the seventh TFT T7 is coupled with the photodiode PD.

A voltage output by the high voltage end VDD is greater than a voltage output by the low voltage end Vss. SCAN_N−1 is a scanning sequence signal for an upper-level pixel circuit, SCAN_is a scanning sequence signal for a current-level pixel circuit, and CR1 and CR2 are control signals for the current-level pixel circuit.

The pixel circuit of this embodiment is driven in a time-sharing manner, i.e., an In-cell touch signal is detected at first, and then the threshold voltage of the OLED is compensated and the pixels are driven.

At an In-cell optical touch signal detecting stage, the collected touch signals vary when the photodiode PD is touched or not touched, and a coordinate of a touch position is detected and determined, thereby to achieve a pointing touch function.

At an OLED driving stage, the threshold voltage Vth of the first TFT T1 of the OLED is written into the first capacitor C1, and then the data voltage Vdata of the data signal is written into the second capacitor C2, so that the gate voltage of the first TFT T1 is Vdata+Vth. As a result, the driving current of the OLED is irrelevant to Vth and the current remains unchanged, and thereby it is able to improve the uniformity and the reliability.

The specific operational procedure will be described hereinafter.

In-Cell Optical Touching Stage (1) An initializing stage, where SCAN_N−1, SCAN_and CR1 are at a low level, CR2 is at a high level, TFTs T1, T3 and T4 are switched on, TFTs T2, T5, T6 and T7 are switched off, a VDD voltage is written into point A, i.e., VA=VDD, and the voltage of the first capacitor C1 and the second capacitor C2 is VC1+VC2=VA−VSS=VDD−VSS.

(2) A touch detecting stage, where SCAN_N−1 is at a high level, SCAN, CR1 and CR2 are at a low level, TFTs T1, T6 and T7 are switched on, TFTs T2, T3, T4 and T5 are switched off, point A is coupled with the photodiode PD via TFT T7. The leakage current is different when the photodiode PD is touched (not exposed to light) or not touched (exposed to light), and the leakage current of the photodiode PD when exposed to light is larger than that when not exposed to light. A change of the leakage current when the photodiode PD is touched or not touched will lead to a voltage change at point A, and after such a voltage change at point A is amplified by TFT T1, it is transmitted via a read line to and parsed by a detection module, so as to determine whether a corresponding pixel position is touched.

The threshold voltage of the OLED is compensated and the pixels are driven immediately after the In-cell optical touch detecting stage.

(3) A buffering stage, where SCAN_N−1, SCAN, CR1 and CR2 are at a low level, and TFTs T1-T7 are switched off. Point A is discharged via the first capacitor C1 and the second capacitor C2 to VSS, and the level at point A is decreased to Vss, so as to eliminate the affect produced by the touch at the previous stage.

(4) A threshold voltage compensating stage, where SCAN_N−1, SCAN and CR1 are at a low level, CR2 is at a high level, TFTs T1, T3 and T4 are switched on, and TFTs T2, T5, T6 and T7 are switched off. The first TFT T1 becomes a diode and enters a saturation state. The second capacitor C2 is charged by the high voltage end VDD via the first TFT T1, until the gate voltage of the first TFT T1, i.e., the voltage difference between points A and B, is Vth. At this time, VA=VDD, VB=VDD−Vth, and the voltage across the first capacitor C1 is VC1=VA−VB=VDD−(VDD−Vth)=Vth, i.e., the threshold voltage Vth of the TFT T1 is written into the first capacitor C1.

(5) A display stage, where SCAN_N−1 and CR2 are at a low level, SCAN_and CR1 are at a high level, TFTs T2 and T5 are switched on, and TFTs T1, T3, T4, T6 and T7 are switched off. The data voltage Vdata is written into the second capacitor C2, VB=Vdata, and the voltage across the second capacitor C2 is VC2=VB=Vdata. The voltage of the first capacitor C1 cannot be changed abruptly, so VA=VB+VC1=Vdata+Vth. The first TFT T1 is driven by the voltage at end A of the first capacitor C1, so that the OLED starts to emit light. The gate-to-source voltage (i.e., the voltage difference between the gate electrode and the source electrode) of the first TFT T1 is Vgs=VA−Voled=Vdata+Vth−Voled, and the driving current passing through the OLED I=K(Vgs−Vth)^2=K(Vdata+Vth−Voled−Vth)^2=K(Vdata−Voled)^2, where K is a structural parameter.

(6) A display maintaining stage, where SCAN_N−1, SCAN_and CR2 are at a low level, CR1 is at a high level, TFT T5 is switched on, TFTs T1, T2, T3, T4, T6 and T7 are switched off. There is no charging or discharging path for the first capacitor C1 or the second capacitor C2, and according to the principle of charge conservation, there is no loop to consume the charges, so the charges on the first capacitor C1 and the second capacitor C2, and the voltage across thereof will remain unchanged. VC2=Vdata, VC1=Vth, VB=Vdata, VA=Vdata+Vth, and the voltage at point A remains unchanged, so the current passing through the OLED is kept as I=K(Vdata−Voled)^2. The OLED will be maintained at a light-emitting state when the data voltage is written thereinto.

Figure 6:
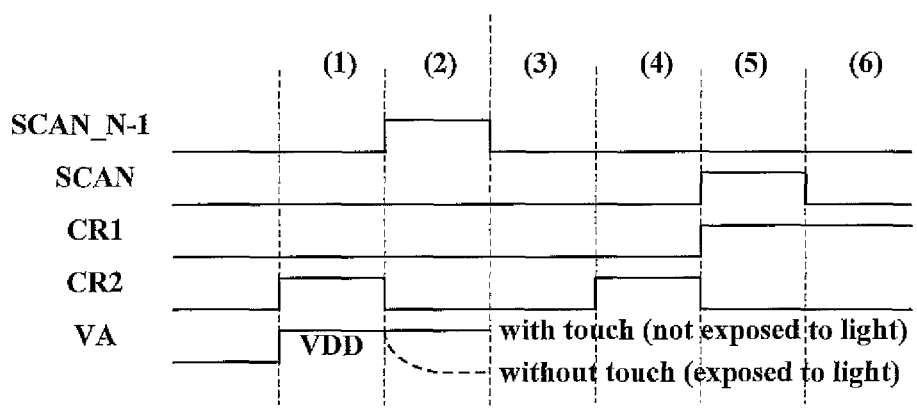
FIG. 6 is a sequence diagram of the pixel circuit according to the fifth embodiment of the present invention.

FIG. 6 is a sequence diagram of the pixel circuit according to the fifth embodiment of the present invention.

In this embodiment, T1-T7 are all N-type TFTs. Of course, in the other embodiments, P-type TFTs may also be used.

Sixth Embodiment

In this embodiment, a display device comprising the pixel circuit according to any one of the above embodiments is provided.

The above are merely the preferred embodiments of the present invention. It should be noted that, a person skilled in the art may further make improvements and modifications without departing from the principle of the present invention, and these improvements and modifications shall also be considered as the scope of the present invention.

What is claimed is:

1. A pixel circuit, comprising: a driver amplifying unit, a compensating unit, a light-emitting unit, a light-emission controlling unit, a charging unit, a touching unit and an outputting unit, wherein
the light-emitting unit is coupled with the light-emission controlling unit and a low voltage end, configured to emit light under the control of the light-emission controlling unit;
the light-emission controlling unit is coupled with the light-emitting unit and the driver amplifying unit, configured to control the light-emitting unit to emit light at a display stage;
the touching unit, coupled with the driver amplifying unit and the low voltage end, configured to generate a touch signal;
the driver amplifying unit, coupled with the compensating unit, a high voltage end, the touching unit and the light-emission controlling unit, configured to amplify the touch signal generated by the touching unit at a touch stage and drive the light-emitting unit to emit light at the display stage;
the outputting unit, coupled with the driver amplifying unit, configured to output the touch signal amplified by the driver amplifying unit;
the charging unit, coupled with the compensating unit configured to charge the compensating unit; and
the compensating unit, coupled with the charging unit, the driver amplifying unit, the low voltage end and the high voltage end, configured to be charged by the high voltage end prior to the display stage so that a gate voltage of the driver amplifying unit is equal to a threshold voltage of the driver amplifying unit, and be charged by the charging unit at the display stage so that the gate voltage of the driver amplifying unit is equal to a sum of a data voltage output by the charging unit and the threshold voltage;
wherein the driver amplifying unit comprises a first TFT, a gate electrode of the first TFT is coupled with the compensating unit and the touching unit, a first electrode of the first TFT is coupled with the high voltage end, and a second electrode of the first TFT is coupled with the light-emission controlling unit and the outputting unit;
wherein the compensating unit comprises a third TFT, a fourth TFT, a first capacitor and a second capacitor;
a gate electrode of the third TFT is coupled with a first control signal input end, a first electrode of the third TFT is coupled with the high voltage end, and a second electrode of the third TFT is coupled with the gate electrode of the first TFT;
a gate electrode of the fourth TFT is coupled with the first control signal input end, a first electrode of the fourth TFT is coupled with the charging unit, and a second electrode of the fourth TFT is coupled with the second electrode of the first TFT;
one end of the first capacitor is coupled with the gate electrode of the first TFT and the second electrode of the third TFT, and the other end of the first capacitor is coupled with one end of the second capacitor, the first electrode of the fourth TFT and the charging unit; and
one end of the second capacitor is coupled with the low voltage end, and the other end of the second capacitor is coupled with one end of the first capacitor, the first electrode of the fourth TFT and the charging unit.

2. The pixel circuit according to claim 1, wherein the charging unit comprises a second TFT, a gate electrode of the second TFT is coupled with a second control signal input end, a first electrode of the second TFT is coupled with a data signal input end, and a second electrode of the second TFT is coupled with the first electrode of the fourth TFT.

3. The pixel circuit according to claim 1, wherein the light-emission controlling unit comprises a fifth TFT, a gate electrode of the fifth TFT is coupled with a third control signal input end, a first electrode of the fifth TFT is coupled with the second electrode of the first TFT, and a second electrode of which is coupled with the light-emitting unit.

4. The pixel circuit according to claim 1, wherein the touching unit comprises a touch signal generating unit and a seventh TFT;
one end of the touch signal generating unit is coupled with the seventh TFT, and the other end of the touch signal generating unit is coupled with the low voltage end; and
a gate electrode of the seventh TFT is coupled with a fourth control signal input end, a first electrode of the seventh TFT is coupled with the gate electrode of the first TFT, and a second electrode of the seventh TFT is coupled with the touch signal generating unit.

5. The pixel circuit according to claim 4, wherein the outputting unit comprises a sixth TFT, a gate electrode of which is coupled with the fourth control signal input end, a first electrode of the sixth TFT is coupled with the second electrode of the first TFT, and a second electrode of the sixth TFT is coupled with a touch signal output end.

6. The pixel circuit according to claim 1, wherein
the driver amplifying unit comprises a first TFT;
the charging unit comprises a second TFT;
the compensating unit comprises a third TFT, a fourth TFT, a first capacitor and a second capacitor;
the light-emitting unit comprises an OLED;
the light-emission controlling unit comprises a fifth TFT;
the outputting unit comprises a sixth TFT;
the touching unit comprises a photodiode and a seventh TFT; wherein
a gate electrode of the first TFT is coupled with a source electrode of the third TFT, a drain electrode of the first TFT is coupled with the high voltage end, and a source electrode of the first TFT is coupled with a drain electrode of the fifth TFT;
a gate electrode of the second TFT is coupled with a second control signal input end, a drain electrode of the second TFT is coupled with a data signal input end, and a source electrode of the second TFT is coupled with a drain electrode of the fourth TFT;
a gate electrode of the third TFT is coupled with a first control signal input end, a drain electrode of the third TFT is coupled with the high voltage end, and the source electrode of the third TFT is coupled with the gate electrode of the first TFT;
a gate electrode of the fourth TFT is coupled with the first control signal input end, the drain electrode of the fourth TFT is coupled with the source electrode of the second TFT, and the source electrode of the fourth TFT is coupled with the source electrode of the first TFT;
one end of the first capacitor is coupled with the gate electrode of the first TFT and the source electrode of the third TFT, and the other end of the first capacitor is coupled with one end of the second capacitor, the drain electrode of the fourth TFT and the source electrode of the second TFT;
one end of the second capacitor is coupled with the low voltage end, and the other end of the second capacitor is coupled with one end of the first capacitor, the drain electrode of the fourth TFT and the source electrode of the second TFT;
a gate electrode of the fifth TFT is coupled with a third control signal input end, the drain electrode of the fifth TFT is coupled with the source electrode of the first TFT, and a source electrode of the fifth TFT is coupled with the OLED;
a gate electrode of the sixth TFT is coupled with a fourth control signal input end, the drain electrode of the sixth TFT is coupled with the source electrode of the first TFT, and a source electrode of the sixth TFT is coupled with a touch signal output end;
one end of the photodiode is coupled with a source electrode of the seventh TFT, and the other end the photodiode is coupled with the low voltage end; and
a gate electrode of the seventh TFT is coupled with the fourth control signal input end, the drain electrode of the seventh TFT is coupled with the gate electrode of the first TFT, and the source electrode of the seventh TFT is coupled with the photodiode.

7. A display device comprising the pixel circuit according to claim 1.

8. A method for driving the pixel circuit according to claim 1, comprising:
a touching step, generating, by a touching unit, a touch signal, amplifying, by a driver amplifying unit, the touch signal, and outputting, by an outputting unit, the touch signal amplified by the driver amplifying unit;
a threshold voltage compensating step, charging, by a high voltage end, a compensating unit so that a gate voltage of the driver amplifying unit is equal to a threshold voltage of the driver amplifying unit; and
a displaying step, charging, by the charging unit, the compensating unit so that the gate voltage of the driver amplifying unit is equal to a sum of a data voltage output by the charging unit and the threshold voltage.

9. The method according to claim 8, wherein the touching step comprises:
an initializing step, switching on a first TFT, a third TFT and a fourth TFT and switching off a second TFT, a fifth TFT, a sixth TFT and a seventh TFT by controlling levels of a first control signal, a second control signal, a third control signal and a fourth control signal; and
a touch detecting step, switching off the first TFT, the sixth TFT and the seventh TFT and switching off the second TFT, the third TFT, the fourth TFT and the fifth TFT.

10. The method according to claim 8, wherein
the threshold voltage compensating step comprises switching on the first TFT, the third TFT and the fourth TFT and switching off the second TFT, the fifth TFT, the sixth TFT and the seventh TFT by controlling the levels of the first control signal, the second control signal, the third control signal and the fourth control signal, so that a second capacitor is charged by the high voltage end until a gate voltage of the first TFT is equal to a threshold voltage of the first TFT; and
the displaying step comprises switching on the second TFT and the fifth TFT and switch off the first TFT, the third TFT, the fourth TFT, the sixth TFT and the seventh TFT, so that the second capacitor is charged by a data signal input end and the gate voltage of the first TFT is equal to a sum of a data voltage output by the data signal input end and the threshold voltage of the first TFT.

11. The method according to claim 10, wherein subsequent to the displaying step, the method further comprises:
a display maintaining step, switching on the fifth TFT and switching off the first TFT, the second TFT, the third TFT, the fourth TFT, the sixth TFT and the seventh TFT by controlling the levels of the first control signal, the second control signal, the third control signal and the fourth control signal.

12. The method according to claim 10, wherein subsequent to the touching step and prior to the threshold voltage compensating step, the method further comprises:
a buffering step, switching off the first TFT, the second TFT, the third TFT, the fourth TFT, the fifth TFT, the sixth TFT and the seventh TFT by controlling the levels of the first control signal, the second control signal, the third control signal and the fourth control signal, so that the gate voltage of the first TFT is equal to a voltage of a low voltage end.

13. The method according to claim 9, wherein
the threshold voltage compensating step comprises switching on the first TFT, the third TFT and the fourth TFT and switching off the second TFT, the fifth TFT, the sixth TFT and the seventh TFT by controlling the levels of the first control signal, the second control signal, the third control signal and the fourth control signal, so that a second capacitor is charged by the high voltage end until a gate voltage of the first TFT is equal to a threshold voltage of the first TFT; and the displaying step comprises switching on the second TFT and the fifth TFT and switch off the first TFT, the third TFT, the fourth TFT, the sixth TFT and the seventh TFT, so that the second capacitor is charged by a data signal input end and the gate voltage of the first TFT is equal to a sum of a data voltage output by the data signal input end and the threshold voltage of the first TFT.

14. The method according to claim 13, wherein subsequent to the displaying step, the method further comprises:
a display maintaining step, switching on the fifth TFT and switching off the first TFT, the second TFT, the third TFT, the fourth TFT, the sixth TFT and the seventh TFT by controlling the levels of the first control signal, the second control signal, the third control signal and the fourth control signal.

15. The method according to claim 13, wherein subsequent to the touching step and prior to the threshold voltage compensating step, the method further comprises:
a buffering step, switching off the first TFT, the second TFT, the third TFT, the fourth TFT, the fifth TFT, the sixth TFT and the seventh TFT by controlling the levels of the first control signal, the second control signal, the third control signal and the fourth control signal, so that the gate voltage of the first TFT is equal to a voltage of a low voltage end.

* * * * *